United States Patent [19]

Matthis

[11] 3,872,685
[45] Mar. 25, 1975

[54] EVAPORATOR TEMPERATURE CONTROL FOR REFRIGERATION SYSTEMS

[75] Inventor: Alan A. Matthis, Milwaukee, Wis.

[73] Assignee: Controls Company of America, Schiller Park, Ill.

[22] Filed: Jan. 15, 1974

[21] Appl. No.: 433,831

Related U.S. Application Data

[63] Continuation-in-part of Ser. No. 341,912, March 16, 1973, abandoned.

[52] U.S. Cl. ................................... 62/196, 62/217
[51] Int. Cl. ............................................ F25b 41/04
[58] Field of Search .............. 62/217, 196, 222–225

[56] References Cited
UNITED STATES PATENTS

| | | | |
|---|---|---|---|
| 2,309,773 | 2/1943 | Kaufman | 62/217 |
| 3,380,262 | 4/1968 | Miner | 62/217 |
| 3,577,743 | 5/1971 | Long | 62/225 |

*Primary Examiner*—Meyer Perlin
*Attorney, Agent, or Firm*—Michael, Best & Friedrich

[57] ABSTRACT

Each of the two refrigeration systems incorporates an electric evaporator temperature control regulated by a solid state temperature switch which may be adjusted for a desired temperature and may be located in a remote location. In one system the control valve is located in the suction line between the evaporator and compressor and functions to throttle flow to the compressor when the temperature at the thermistor sensing probe falls below the set point. In the other system the temperature control valve functions as a hot gas bypass valve from the compressor outlet to the suction line between the evaporator and the compressor. The valve is opened when the temperature at the thermistor sensing probe falls below the set point. In either system operation of the temperature control valve acts to control pressure in the evaporator and thus controls the temperature. With the sensor located in the air stream, the system functions to control the air stream temperature and will compensate the system for frost build-up on the evaporator. The temperature control valve itself is preferably a ported sleeve-type valve actuated by a bimetallic stack energized by a heater regulated by the remote temperature sensing control. The temperature control includes a thermistor which forms part of an adjustable branch of a bridge circuit, the output of which is fed into a signal amplifier which, in turn, feeds into a power amplifier to give a desired voltage change per a selected increment of temperature deviation from the set point. In addition to giving remote sensing and adjustability, this system achieves close temperature control and more rapid pulldown of the system since there is a minimal modification of evaporator temperature/pressure until the desired temperature is reached. When used in a display case the system can incorporate an added resistance and switch to shift the set point to compensate for changed ambient conditions.

4 Claims, 5 Drawing Figures

EVAPORATOR TEMPERATURE CONTROL FOR REFRIGERATION SYSTEMS

CROSS-REFERENCES TO RELATED APPLICATIONS

This application is a continuation-in-part of my patent application Ser. No. 341,912, filed Mar. 16, 1973 and now abandoned.

BACKGROUND OF THE INVENTION

The matter of controlling refrigeration and air conditioning systems to maintain a desired temperature has been somewhat empirical in that the temperature at a regulated location was not necessarily the temperature sensed but frequently required sensing a different temperature and assuming a given relationship between the sensed temperature and the temperature desirably maintained constant. Furthermore, the accuracy of control was not particularly high. Most systems impede the pulldown period . . . the time required from starting at room temperature to reaching the desired temperature . . . due to the fact the systems begin to operate (modify the system) before the set temperature is reached. Furthermore, most systems do not relate to the actual temperature to be controlled.

SUMMARY OF THE INVENTION

Either of the two systems achieves a highly accurate temperature control and it is possible to control the temperature at the exact point desired. Thus the temperature sensing probe may be located in the air stream leading from the evaporator coil or in the air entering the coil or in the refrigerated space and control the temperature at the sensor without regard for the system per se — thus compensating for frost build-up on the evaporator. Furthermore, the temperature setting can be adjusted easily from any desired location such as a central control console which may be quite some distance from the point of temperature sensing and from the evaporator. For example, a supermarket display case temperature can be controlled or adjusted from a central control console located in the compressor room or in the basement of the supermarket while the temperature sensor may be in the case. When the supermarket closes and the ambient conditions change, the temperature set point can be shifted to compensate.

DESCRIPTION OF THE PREFERRED EMBODIMENTS

Figure 1:
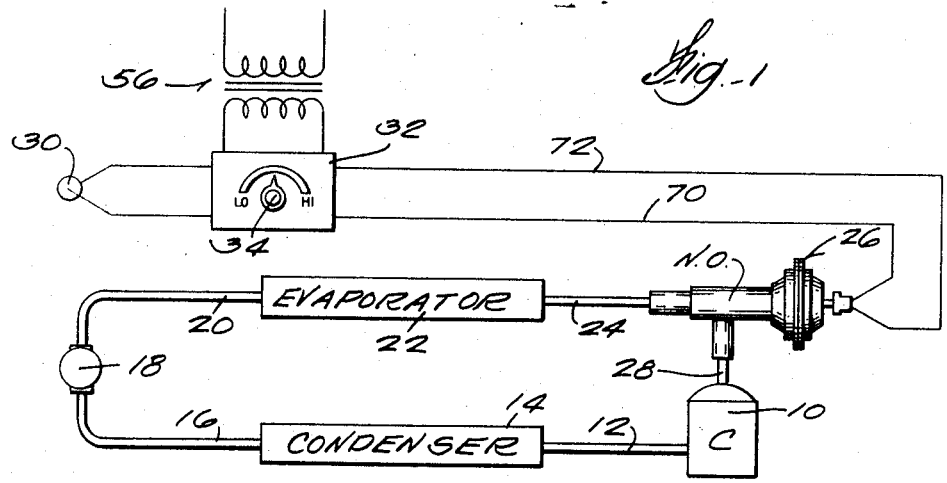
FIG. 1 shows a control system in which the flow from the evaporator to the compressor is throttled when the temperature at a desired location reaches a preselected control temperature.

In the system of FIG. 1 compressor 10 delivers hot compressed refrigerant to discharge conduit 12 leading to condenser 14 where the hot gas is condensed. The condenser outlet supplies liquid refrigerant to conduit 16 leading to expansion valve 18 which regulates flow to conduit 20 leading to the evaporator 22. The expansion valve may be of any desired type, the selection of such a valve not being critical to this system. The evaporator outlet is connected to conduit 24 which leads to control valve 26 which regulates flow to the compressor suction line 28. The control valve 26 is normally closed and will not operate to throttle flow or close until the temperature at the sensing probe 30 has reached a preselected temperature as set at the control box 32 by turning knob 34 to the desired setting.

The sensing probe can be located wherever it is desirable to sense the temperature, that is the temperature deemed most appropriate for the particular system being regulated. For example, the probe may be placed in the air leaving the evaporator coil or in the air being returned from the refrigerated space just upstream of the coil.

Figure 3:
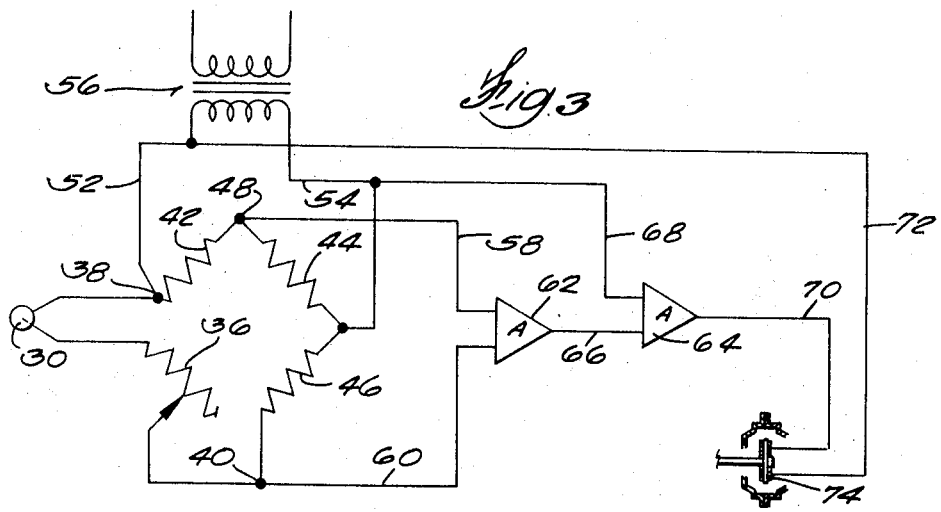
FIG. 3 is a schematic diagram of the control circuit for regulating the valve.

Thermistor 30 is connected in series with an adjustable resistance 36 in one branch of a Wheatstone bridge in the control box 32. Thus the thermistor and the adjustable resistance are connected between points 38 and 40 of the bridge circuit shown in FIG. 3. The other three branches of the bridge circuit include resistances 42, 44, 46 with the control signals being derived at junctions 40 and 48 while the 24-volt AC supply is impressed on the bridge at junctions 38 and 50 to which leads 52, 54 are connected from the output of transformer 56. The control signals at junctions 48 and 40 are fed through lines 58, 60 to the signal amplifier 62 with the output of the amplifier being fed into power amplifier 64 through lead 66. One side of the AC supply from the transformer is also fed into the power amplifier 64 through lead 68. The output of the power amplifier is supplied to lead 70 which is connected to the control valve 26. Lead 72 from one side of the transformer goes directly to the control valve 26. Within the valve 26 there is a heater 74 which is located in heat transfer relationship to a bimetallic stack 76 which will deflect when heated, the deflection being proportional to the heat (voltage) supplied. The bimetal stack is made up of the requisite number of bimetals which are stacked high expansion side-to-high expansion side and low expansion side-to-low expansion side so as to achieve a considerable amount of motion with large force and relatively small heat input.

The valve body has an inlet 78 and an outlet 80. A fixed cylindrical member 82 provided with a plurality of axially spaced slots 82 is adjustably mounted at 84 (for calibration purposes) and a sleeve-type valve 86 fits over the cylinder 80 and is biased upwardly by spring 88 against pin 90 which engages the bimetallic stack. When full heat is applied, the bimetallic stack flexes and the ports 92 in the sleeve valve 86 are brought into registry with the slots in the cylinder 82, thus allowing full flow. At this time shoulder 89 abuts the top of cylinder 80. This type of valve permits more sensitive or accurate positioning of the moving sleeve and thus improves the throttling characteristic of the control. Normally the valve is open (full heat applied)

but when the temperature at the sensor-thermistor reaches the set point, the voltage applied to the heater 74 will be decreased and thus the sleeve valve will start to throttle flow from the evaporator to the compressor and prevent further decrease in evaporator pressure-temperature. A desirable characteristic is to have the control system change the applied voltage approximately 8 volts per degree below the set point. The sensitivity of the temperature control can be designed to almost any desired voltage change versus temperature change. If desired, for example, a temperature change of only 0.1 °F could be used to trigger the voltage change to initiate valve modulation.

With a sleeve valve the leakage is a function of the diameter (and, hence, circumference) of the sleeve port. Therefore, good valve design would indicate the sleeve port diameter should be kept to a minimum. With the present type valve, with the long stroke provided by the stacked bimetal design, the sleeve port area can be retained at a maximum width (stroke) and a minimum length (circumference). While the present heat motor-type valve is well suited to the job, the invention is not limited to this specific type valve.

Figure 4:
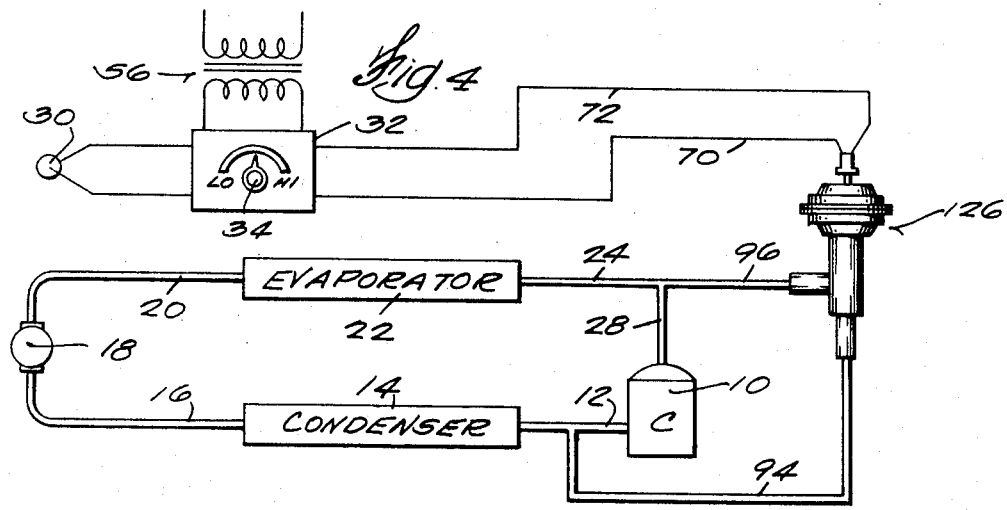
FIG. 4 is another system in which the evaporator pressure and temperature are regulated by opening an electrically operated control valve when the control temperature is reached to bypass hot compressed gas into the evaporator or suction portion of the refrigeration system.
Figure 2:
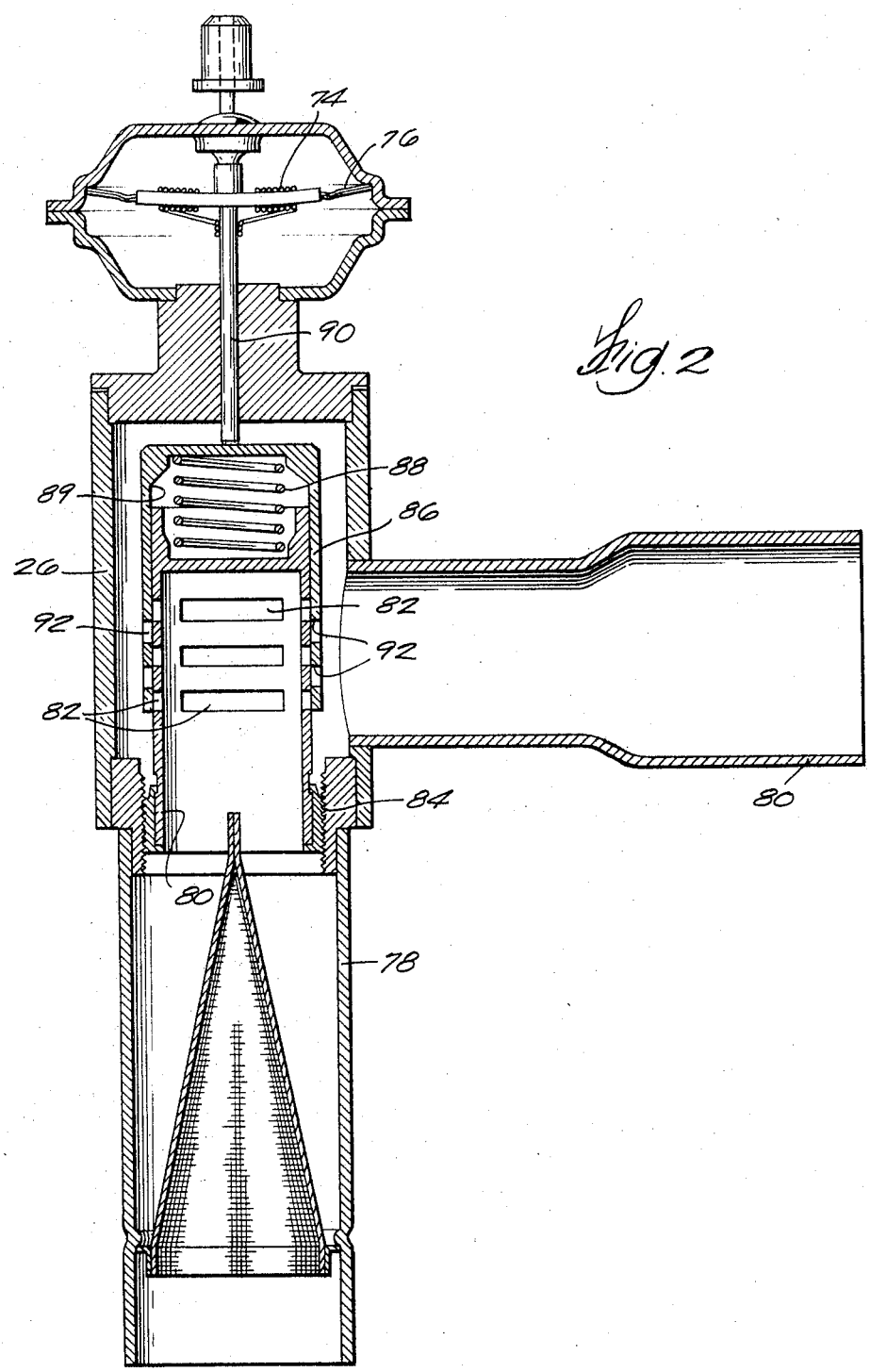
FIG. 2 is a detail view of the control valve used in the present systems.
Figure 5:
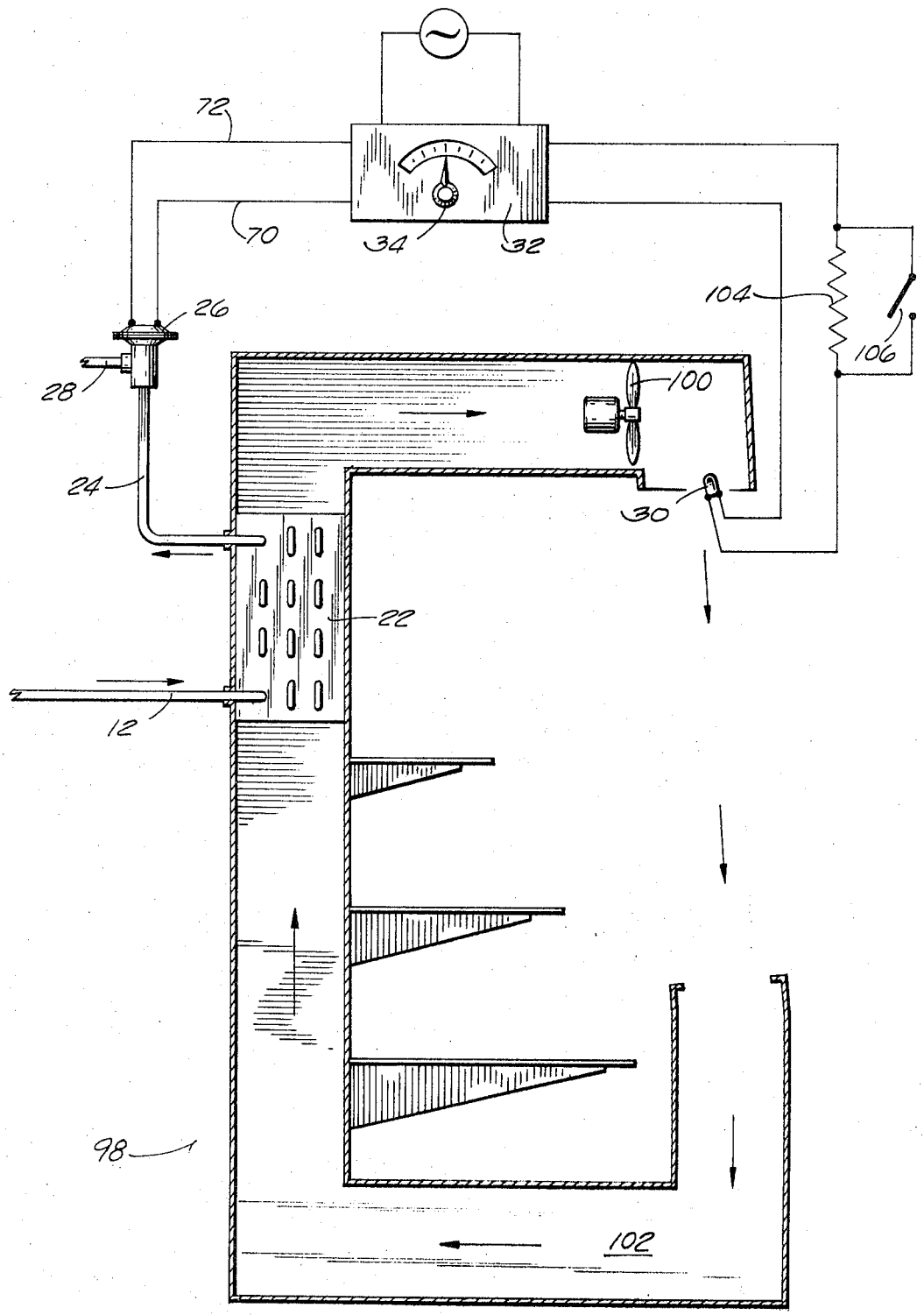
FIG. 5 shows the system in a display case.

In the system of FIG. 4 there are only two significant differences. First there is a bypass conduit 94 from the compressor discharge line 12 to the inlet of valve 126, the outlet of which is connected via conduit 96 to the suction line 28 and the evaporator outlet 24. In this arrangement the valve 126 operates in an opposite sense, that is in a normal pulldown condition the valve will be closed rather than open as in FIG. 1. When the temperature set point has been reached, however, the valve 126 will be actuated to start to open and pass hot compressed gas to the evaporator side of the expansion valve. This gas could be introduced upstream of the evaporator as well as downstream, the important thing is that being at higher pressure it of necessity raises the pressure and temperature within the evaporator and thus the control of temperature is achieved. In FIG. 4 the control is achieved by introducing hot compressed gas to the evaporator side of the system while in FIG. 1 the control is achieved by throttling the flow from the evaporator. The net effect is the same and FIG. 1 is preferred since it entails fewer connections and less piping. In either instance the increasing pressure in the evaporator will work back onto the expansion valve to tend to throttle the expansion valve.

Both systems give accurate temperature control which may be adjusted from any desired location since the control box 32 can be located wherever desired, it being only necessary to be wired to the valve and to the sensing probe. The sensing probe can be located at the precise place where the temperature is to be controlled.

This system offers a further advantage in that the pulldown is maximized since there is no throttling until the set point has been reached. At that time throttling occurs and achieves rapid control of the system. Other systems regulating evaporator outlet conditions start to control (and thus impede pulldown) well in advance of reaching the desired condition.

When the system is applied to an air curtain type display case 98, the probe 30 can be located in the cold air leaving fan 100 which pulls air across the evaporator 22 and blows the air down across the open front of the case to the return duct 102 leading back to the evaporator. When so located, the probe functions to control the temperature at the probe 30 without regard for evaporator conditions. Therefore, as frost builds up on the evaporator 22 (which would normally result in a rising temperature) the control will lower the temperature at the evaporator to compensate for the frost — thus maintaining the desired temperature at the probe. The system incorporates a resistance 104 which is connected in series in the thermistor leg of the bridge circuit and can be shunted by switch 106 to remove the resistance from the circuit. Switch 106 can be operated manually or by a clock. This allows the temperature set point to be shifted readily. When the store is open, the contents of the display case are subjected to radiant heat from the store lighting and warm air is dispersed into the case by customers. When the store closes, these outside heating sources are removed and the temperature in the case will fall — frequently below the desired optimum conditions. By shifting the temperature set point by means of the change in resistance (by operating switch 106) the air curtain temperature can be raised 3°–4° to optimize conditions while the store is closed. Or the temperature can be raised to cause the evaporator to defrost.

I claim:

1. A control for regulating the temperature in a space refrigerated by a system including a compressor, condenser, an expansion valve, and an evaporator, the compressor discharging hot compressed refrigerant to the condenser where it is condensed and the refrigerant flow to the evaporator is regulated by the expansion valve, the evaporator outlet being connected to the compressor inlet, an electrically operated control valve located between the evaporator and the compressor and operative to control evaporator pressure and thus temperature independently of the expansion valve, a temperature sensing thermistor located in the refrigerated space at a point at which the temperature is to be controlled, an electric circuit including the thermistor and the control valve and an electric bridge circuit having the thermistor electrically connected in one branch of the bridge, means for adjusting the resistance of said one branch whereby the temperature setting of the control may be adjusted to determine the temperature maintained at the thermistor, said bridge circuit being operative to develop a control signal which is amplified and supplied to the control valve to cause the control valve to be actuated to control evaporator pressure solely as function of the temperature at the thermistor and as a result the evaporator pressure is compensated for presence of frost on the evaporator or other restriction upon heat transfer.

2. A control according to claim 1 including a second resistance in series with said one branch of said bridge circuit, and a switch for shunting said second resistance whereby the temperature set point as determined by said adjusting means can be shifted by having the second resistance in or out of the circuit.

3. A control according to claim 1 in which the control valve is located in the flow path between the evaporator and the compressor and is open until the selected control temperature is reached at which time it functions to throttle flow to the compressor and thereby prevent further pulldown of evaporator pressure and temperature.

4. A control according to claim 1 including a bypass conduit from the compressor discharge to a point downstream of the expansion valve, said control valve being located in the bypass conduit and being closed until the selected control temperature is reached at which time it opens to pass hot compressed refrigerant and thereby prevent further pulldown of evaporator pressure and temperature.

* * * * *

PO-1050
(5/69)

UNITED STATES PATENT OFFICE
CERTIFICATE OF CORRECTION

Patent No. 3,872,685            Dated March 25, 1975

Inventor(s) Alan A. Matthies

It is certified that error appears in the above-identified patent and that said Letters Patent are hereby corrected as shown below:

The name of the Inventor should read -- Alan A. Matthies --.

Column 4, line 27 of claim 1, after "as", insert -- a --.

Signed and sealed this 27th day of May 1975.

(SEAL)
Attest:

RUTH C. MASON
Attesting Officer

C. MARSHALL DANN
Commissioner of Patents
and Trademarks

Dedication 3,872,685.—*Alan A. Matthies*, Milwaukee, Wis. EVAPORATOR TEMPERATURE CONTROL FOR REFRIGERATION SYSTEMS. Patent dated Mar. 25, 1975. Dedication filed Apr. 13, 1977, by the assignee, *The Singer Company*.

Hereby dedicates to the Public the entire term of said patent.

[*Official Gazette June 7, 1977.*]